(12) United States Patent
Hoven et al.

(10) Patent No.: US 6,781,542 B2
(45) Date of Patent: Aug. 24, 2004

(54) METHOD AND SYSTEM FOR ESTIMATING IONOSPHERIC DELAY USING A SINGLE FREQUENCY OR DUAL FREQUENCY GPS SIGNAL

(75) Inventors: Randall M. Hoven, Alton, IL (US); Harold A. Klotz, Jr., East Carondelet, IL (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/341,080

(22) Filed: Jan. 13, 2003

(65) Prior Publication Data

US 2004/0135721 A1 Jul. 15, 2004

(51) Int. Cl.[7] ................................................ H04B 7/185
(52) U.S. Cl. .................................. 342/357.02; 342/358
(58) Field of Search ............................ 342/357.01–358

(56) References Cited

U.S. PATENT DOCUMENTS 5,867,411 A 2/1999 Kumar
6,356,232 B1 * 3/2002 Rocken et al. ......... 342/357.02

OTHER PUBLICATIONS

E.L. Afraimovich et al., The updated ionospheric delay model to improve the performance of GPS single–frequency receivers, Radio–Science (USA), vol. 35, No. 1, p. 257–62, Jan.–Feb. 2000.*

J.C. Braun et al., Operating a dense L1 GPS network for atmospheric sensing, EOS, Trans. Am. Geophys. Union, 80, G12A–09 1999.*

J.C. Braun et al., Installation and operation of a GPS system around the ARM Southern Great Plains central facility to observe water vapor fields, Proc. 10th ARM Science Team Meeting, 2000.*

Brain et al.; *How GPS Receivers work*; Downloaded from http://www.howstuffworks.com/gps.htm/printable on Dec. 23, 2002.

Farrell et al.; *The Global Positioning System and Inertial Navigation*; 1999; pp. 246–251; McGraw–Hill; United States of America.

Gelb et al.; *Applied Optimal Estimation*; 1974; pp. 106–111 and 304–307; The M.I.T. Press; Cambridge, Massachusetts.

Welch et al.; *An Introduction to the Kalman Filter*, Mar. 11, 2002; ; TR 95–041; Department of Computer Science; University of North Carolina at Chapel Hill.

National Geophysical Data Center, NOAA Satellite and Information Services; *Introduction to the ionosphere*; Downloaded from http://www.ngdc.noaa.gov/stp/IONO/Ionontro.html on Dec. 26, 2002.

* cited by examiner

Primary Examiner—Gregory C. Issing
Assistant Examiner—Fred H Mull
(74) Attorney, Agent, or Firm—Thompson Coburn, LLP

(57) ABSTRACT

A global positioning system comprising: (a) a GPS receiver configured to (1) receive a plurality of signals from a plurality of visible GPS satellites, and (2) produce a plurality of pseudorange measurements from the received signals, the pseudorange measurements being indicative of the GPS receiver's position and having an amount of ionospheric delay error contained therein, (b) a processor configured to estimate the amount of ionospheric delay in the pseudorange measurements by (1) estimating an amount of global ionospheric delay attributable collectively to the plurality of visible GPS satellites, and (2) estimating a plurality of amounts of local ionospheric delays, each local ionospheric delay being attributable to a different visible GPS satellite. Preferably the processor implements the ionospheric delay estimations using a modified Kalman filter.

65 Claims, 9 Drawing Sheets

**Diagonal states $p_{1,1}$ through $p_{n,n}$ are baseline covariance estimate states;
**Diagonal state $p_{n+1,n+1}$ is the global covariance estimate state;
**Diagonal states $p_{n+2,n+2}$ through $p_{n+m+1,n+m+1}$ are local covariance estimate states;
**All augmented off-diagonal states are zero;

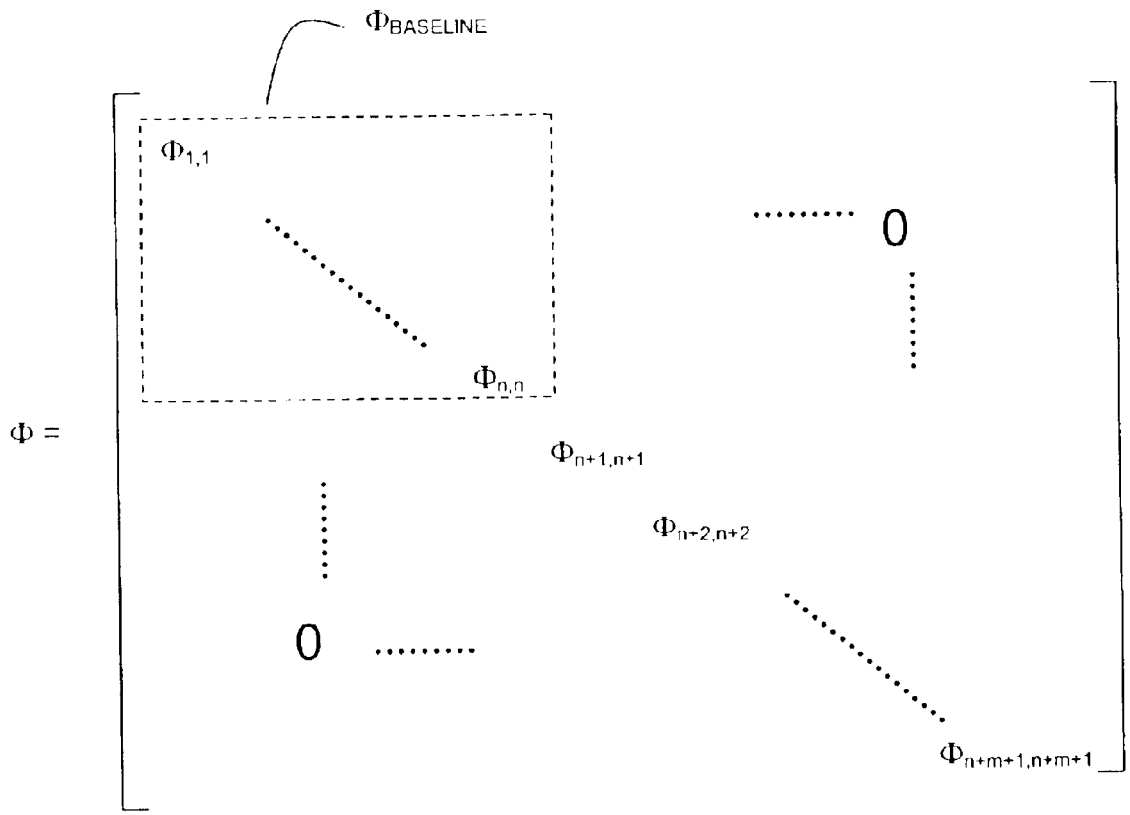

**Diagonal states $\Phi_{1,1}$ through $\Phi_{n,n}$ are baseline state transition elements;

**Diagonal state $\Phi_{n+1,n+1}$ is the global state transition element, wherein $\Phi_{n+1,n+1}$ equals $\rho$;

**Diagonal states $\Phi_{n+2,n+2}$ through $\Phi_{n+m+1,n+m+1}$ are local state transition elements, wherein each local state transition element equals $\rho$;

**All augmented off-diagonal states are zero;

**$\rho = e^{-T/\tau}$

Figure 4

$$Q = \begin{bmatrix} \boxed{\begin{matrix} q_{1,1} & & & \\ & \ddots & & \\ & & & \\ & & & q_{n,n} \end{matrix}}^{Q_{BASELINE}} & & \cdots\cdots & 0 & \\ & & q_{n+1,n+1} & & & \\ & & & q_{n+2,n+2} & & \\ \vdots & & & & \ddots & \\ 0 & \cdots\cdots & & & & q_{n+m+1,n+m+1} \end{bmatrix}$$

\*\*Diagonal states $q_{1,1}$ through $q_{n,n}$ are baseline process noise states;

\*\*Diagonal state $q_{n+1,n+1}$ is the global process noise state, wherein $q_{n+1,n+1}$ equals $\sigma_G^2(1-\rho^2)$;

\*\*Diagonal states $q_{n+2,n+2}$ through $q_{n+m+1,n+m+1}$ are local process noise states, wherein each local process noise state equals $\sigma_L^2(1-\rho^2)$;

\*\*All augmented off-diagonal states are zero;

Figure 5

$$H = \begin{bmatrix} [H_{BASELINE}] & \alpha\beta & \alpha\beta & 0 & 0 & \cdots & 0 \\ [H_{BASELINE}] & \alpha\beta & 0 & \alpha\beta & 0 & \cdots & 0 \\ \vdots & \vdots & \vdots & & & & \vdots \\ [H_{BASELINE}] & \alpha\beta & 0 & 0 & 0 & \cdots & \alpha\beta \end{bmatrix} \begin{matrix} \leftarrow \text{Row 1} \\ \leftarrow \text{Row 2} \\ \\ \leftarrow \text{Row m} \end{matrix}$$

- n baseline elements
- global ionospheric delay coefficient
- m local ionospheric delay coefficients Row(i) = [ $H_{BASELINE}$ $\alpha\beta$ $\alpha\beta H^i_{LOCAL}$ ];
wherein:
$H_{BASELINE}$ is a 1 x n vector of baseline coefficients;
$\alpha$ = obliquity factor;
$\beta$ = frequency scalar;
$H^i_{LOCAL}$ is a 1 x m vector, wherein (1) for j≠i, $H^i_{LOCAL}(j) = 0$, and (2) for j=i, $H^i_{LOCAL}(j) = 1$

Figure 6

METHOD AND SYSTEM FOR ESTIMATING IONOSPHERIC DELAY USING A SINGLE FREQUENCY OR DUAL FREQUENCY GPS SIGNAL

FIELD OF THE INVENTION

The present invention relates to global positioning system (GPS) technology. In particular, the present invention relates to an improved technique for estimating the ionospheric delay in GPS signals.

BACKGROUND OF THE INVENTION

The use of GPS technology has become increasingly prevalent in the world over the past several years. Basic GPS technology is well-known in the art and need not be described in depth herein, but for the purpose of background, its basic principles will be set forth.

GPS utilizes a constellation of satellites orbiting the Earth (28 total in operation with an additional 4 back-up satellites). The orbits of these satellites are arranged so that at any time, anywhere on Earth, 6 to 12 GPS satellites are visible by a GPS receiver. Each satellite broadcasts navigation signals of two frequencies, $L_1$ at 1575.42 MHz and $L_2$ at 1227.6 MHz. The signals are spread spectrum signals transmitted using code division multiple access (CDMA) techniques wherein each GPS satellite is assigned its own code. A GPS receiver operates to receive the signals transmitted by the GPS satellites. The coding present in the GPS satellite signals allows the GPS receiver to separate the different signals that correspond to each visible satellite. The coding also allows the GPS receiver to measure the signal propagation delay from the individual satellites and the GPS receiver. The signal delay along with a clock error shared by measurements to all satellites forms the GPS receiver's estimate of pseudorange. All of these processes are well-known in the art.

The term "pseudorange" is used because this position estimate is obtained after making certain approximations regarding how the signal propagates from the satellite to the receiver. In actuality, there are several sources of error in this approximation, including ephemeris errors, clock errors, receiver noise, and most importantly for the present invention, atmospheric errors, all of which are well-known in the art. The atmospheric errors are due to the effects of both the troposphere and the ionosphere. The contribution of the troposphere to pseudorange error can be well accounted for using existing error modeling techniques. However, there is a need in the art for an improved method of correcting for ionospheric signal delay in pseudorange estimates.

The ionosphere ranges between 100 kilometers to 1000 kilometers above the Earth in altitude. The ionosphere is a dispersive medium that introduces errors greater during the day than at night and greater for satellites near the horizon than for satellites near zenith. Uncompensated iono-errors can range anywhere from 1 meter to more than 60 meters. Typical iono-errors are 10 meters for satellites near zenith and 30 meters for satellites near the horizon. In most GPS applications, the iono-error represents the most dominant source of error in the GPS position estimation.

A current approach used in commercial GPS receivers is to model the ionospheric delay in software using parameters transmitted every 12 minutes from the GPS satellites. This approach cuts the iono-error approximately in half. However, even at this lower error level, the ionosphere serves as a significant error source.

Differential GPS receivers and associated software have the capability of accurately estimating ionospheric delays. However, such delay estimation requires the availability of base stations that transmit reference signals. Such base stations currently do not have global coverage and are costly to implement. As such, the extension of this type of technology to non-differential GPS technology suffers from shortcomings.

Military GPS receivers (or dual-frequency GPS receivers) use measurements made simultaneously on both the $L_1$ and $L_2$ frequencies to correct iono-error (commercial GPS receivers can only operate on a single frequency). A typical error with this approach is 1–2 meters. At this level, the iono-error is commensurate with other GPS error sources. Including all error sources, a well-tuned military GPS receiver and associated software is typically capable of a total circular error probable (CEP) of approximately 4 meters. An example of a dual frequency approach to ionospheric delay estimation can be found in U.S. Pat. No. 5,876,411 issued Feb. 2, 1999 to Kumar, the entire disclosure of which is incorporated herein by reference.

However, it must be noted that the dual frequency approach is problematic in GPS jamming scenarios. Particularly in military applications, a GPS jamming device may be used to jam the $L_1$ and $L_2$ signals. GPS anti-jam (AJ) systems are available, but the cost of an AJ system capable of counter jamming on both the $L_1$ and $L_2$ frequencies is almost twice the cost of a system that can counter jam only one frequency at a time. As such, because it is much more cost-effective to leave a single GPS frequency unjammed at a given time than to unjam both frequencies, a strong need in the art exists for a GPS system that can substantially reduce iono-errors using only a single GPS frequency.

SUMMARY OF THE INVENTION

With this problem in mind, the inventors herein developed the present invention wherein the iono-error modeling software does not require simultaneous measurements in both the $L_1$ and $L_2$ frequencies. Because only a single GPS frequency is needed at any given time to produce highly accurate ionospheric delay estimates, the present invention is suitable for use in a wide variety of applications where jamming of GPS signals may occur, particularly GPS-guided munitions.

One aspect of the invention is to model the ionospheric delay between the GPS receiver antenna and each GPS satellite such that the ionospheric delay consists of a "global" delay (common to all GPS satellites) and "local" delays (each applicable to an individual GPS satellite). The inventors herein have found that the accuracy of such an approach to ionospheric delay estimation is more accurate than the conventional dual frequency approach used in conventional military GPS technology and more accurate than single frequency approaches known to the inventors. The global iono delay is modeled as the delay that would be observed between the GPS receiver antenna and a GPS satellite for a satellite at a known position wherein the ionosphere is an ideal homogeneous layer at a predetermined height above the earth. The preferable known position of such a satellite is at zenith and the preferable predetermined height is 190 nautical miles.

Accordingly, disclosed herein is a method for estimating ionospheric delays present in pseudorange measurements produced by a global positioning system (GPS) receiver configured to track a plurality of GPS satellites, the method comprising: (a) estimating an amount of global ionospheric delay attributable to all of the tracked GPS satellites; and (b) for each tracked GPS satellite, estimating an amount of local ionospheric delay attributable thereto.

Also disclosed herein is a global positioning system comprising: (a) a GPS receiver configured to (1) receive a plurality of signals from a plurality of visible GPS satellites, and (2) produce a plurality of pseudorange measurements from the received signals, the pseudorange measurements being indicative of the GPS receiver's position and having an amount of ionospheric delay error contained therein; (b) a processor configured to estimate the amount of ionospheric delay in the pseudorange measurements by (1) estimating an amount of global ionospheric delay attributable collectively to the plurality of visible GPS satellites, and (2) estimating a plurality of amounts of local ionospheric delays, each local ionospheric delay being attributable to a different visible GPS satellite.

Preferably the processor implements the ionospheric delay estimations using a modified Kalman filter. As noted above, the ionospheric delay amounts may be determined as a function of a single GPS frequency $L_1$ or $L_2$. The particular frequency used may change over time as the frequency available to the GPS receiver changes. Further still, the present invention will also operate when both GPS frequencies are available.

Preferably, the global ionospheric delay amount is initially set equal to a predetermined value and that initial value is subsequently modified as a function of an obliquity factor and a scalar, the scalar being dependent upon the single GPS frequency. The local ionospheric delay amounts are preferably initialized and updated in the same manner.

These and other advantages of the present invention will be in part apparent and in part pointed out in the following description, claims, and referenced figures.

BRIEF DESCRIPTION OF THE DRAWINGS

FIG. 4 depicts the state transition matrix $\Phi$;

FIG. 5 depicts the process noise matrix Q;

FIG. 6 depicts the measurement sensitivity matrix H;

DETAILED DESCRIPTION OF THE PREFERRED EMBODIMENT

Figure 1:
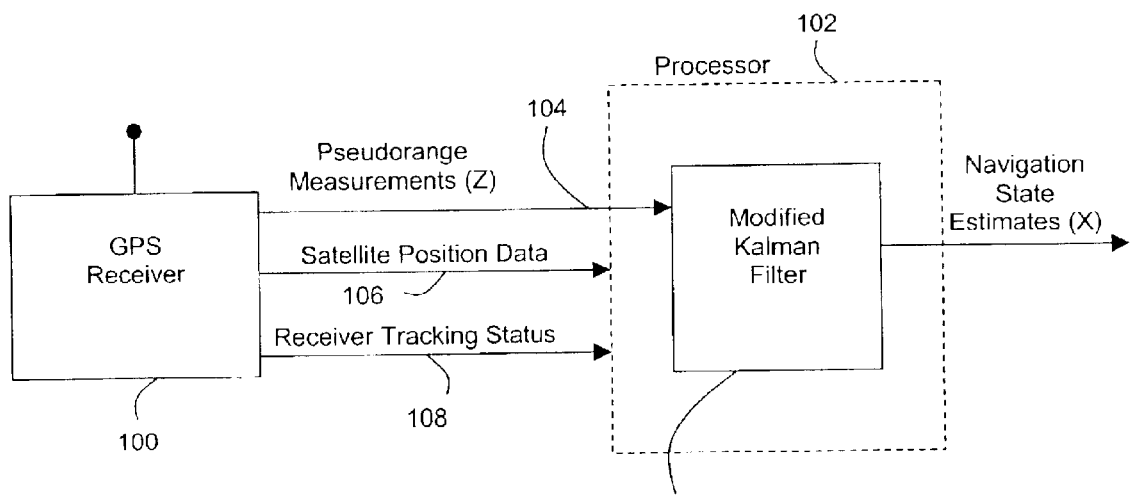
FIG. 1 is a block diagram depicting an overview of a preferred system implementing the present invention.

FIG. 1 is a block diagram depicting the overall position estimating system. A GPS receiver 100 operates to receive GPS signals from orbiting GPS satellites (not shown) and provide pseudorange measurements 104 (found in Z, described below) to processor 102. Processor 102 includes a Kalman filter 110 modified in accordance with the teachings of the present invention. The GPS receiver also preferably provides the processor 102 with satellite position data 106 that identifies the position of each satellite visible to the GPS receiver relative to the center of the earth. Further, the GPS receiver 100 preferably provides the processor 102 with receiver tracking status data 108. The status data 108 includes a satellite ID (identifying which GPS satellite is transmitting) and an identification of the tracking frequency ($L_1$ or $L_2$).

As noted above, the processor 102 implements a modified Kalman filter 110. The processor may be any computing device capable of carrying out programmed instructions of the type set forth below. Preferred processors include the Intel Pentium processor, the Motorola Power PC, and the Texas Instruments TMS 320C6000 family. Typical Kalman filters are well-known in the art, and as such, their basics need not be elaborated upon herein.

Pertinent to the present invention are the additional states that the inventors herein have added to the Kalman filter to model ionospheric delay. The Kalman filter processes the input data to generate estimates of the navigation states (the vector X described below) and estimates of the uncertainties in the navigation state estimates (the matrix P described below).

Upon receipt of the initial data from the GPS receiver (including, in particular, pseudorange measurements and the satellite position data), the Kalman filter vectors and matrices are initialized. The elements of the state vector X are initialized as $X_0$ and the elements of the state covariance matrix P are initialized as $P_0$. As is well-known in the art, the system model can be defined as follows:

$$X_{k+1} = \Phi_k X_k + W_k$$

$$Z_k = H_k X_k + V_k$$

wherein k indexes the time steps for the system, X represents the state vector, $\Phi$ represents the state transition matrix, Z represents the measurement vector (essentially the pseudorange measurements), H represents the measurement sensitivity matrix, and W and V represent, respectively, the process noise vector and measurement noise vector. $W_k$ is approximated by $N(0, Q_k)$ and $V_k$ is approximated by $N(0, R_k)$. The notation $N(\mu, \Sigma)$ indicates the variable is a random variable having a normal (Gaussian) distribution with a mean $\mu$ and a covariance $\Sigma$. Q represents the process noise covariance matrix and R represents the measurement noise covariance matrix.

As new GPS data is provided to the processor, the state variables and matrices are updated as follows:

X=$\Phi$X ; (Propagate state to measurement time)

P=$\Phi P \Phi^T$+Q; (Propagate covariance to measurement time)

K=$PH^T[HPH^T+R]^{-1}$; (Compute Kalman gain)

X=X+K[Z−HX]; (Update the state estimate)

P=[I−KH]P; (Update the covariance estimate)

wherein K represents the Kalman gain vector, I represents the identity matrix, and superscript T indicates matrix transpose. The matrix R is a standard m by m measurement noise covariance matrix.

These Kalman filter equations are well understood in the art (see, for example, Gelb et al., *Applied Optimal Estimation*, MIT Press, 1974, the entire disclosure of which is incorporated herein by reference). As can be seen, these equation variables are generally vectors and matrices, meaning that the implied operations are matrix-vector operations. Formulations for implementing Kalman filter equations other than those described herein exist, and may also be used in the practice of the present invention. Accordingly, the implementation described herein is illustrative of only one possible Kalman filter equation formulation.

Figure 2:
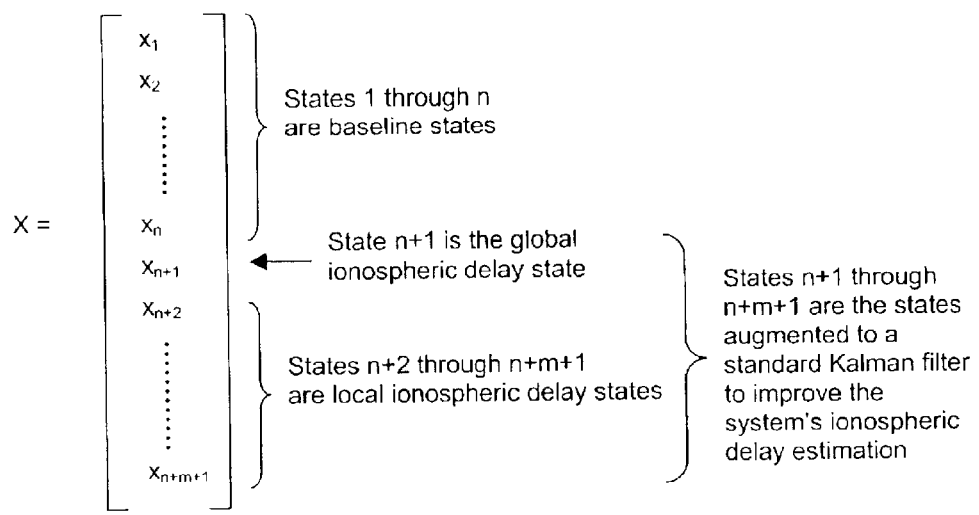
FIG. 2 depicts the state vector X.

A. State Vector X:

FIG. 2 illustrates the matrix X, whose elements represent the Kalman filter states. The first n states ($x_1$ through $x_n$) are the baseline states. These states are the states existing in a standard, unmodified Kalman filter. These states, which account for, at minimum, position, but preferably also include velocity, attitude, and sensor biases. The number n of baseline states, the particular coordinate system used, and whether complete values or deviations from a nominal value are used will vary by implementation according to the application involved. These baseline states are readily understood in the art and need not be further elaborated upon herein. The value of n will depend upon the number of baseline states in the original Kalman filter for the system. A preferred n value is 17.

The next state ($x_{n+1}$) is the global iono state. The global iono state $x_{n+1}$ (or $x_{GLOBAL}$) represents the ionospheric delay at zenith at the $L_1$ frequency for an ideal, homogenous ionosphere modeled as a thin shell at a height of 190 nautical miles. In the present invention, this state is deemed common to all GPS satellites, and should correct for the largest part of the ionospheric delay. It should be noted that, although undesirable, the global ionospheric delay can also be modeled to represent the ionospheric delay at zenith at the $L_2$ frequency for the idealized frequency.

The remaining m states of X (states $x_{n+2}$ through $x_{n+m+1}$) represent the local iono states. Each local iono state corresponds to a particular GPS satellite. Preferably, each state is assigned to a satellite in a consistent manner such that once a local iono state is assigned to a particular satellite, that assignment remains the same as long as the GPS receiver tracks that particular satellite. The local iono states represent deviations (typically less than 2 meters of uncertainty) from the idealized global iono state for each tracked satellite. The value for m may be determined by a practitioner of the invention and will depend upon how many satellites a designer of the system wishes for the GPS receiver and Kalman filter to track. Typically, each GPS satellite is identified by a number from 1 to 32. Up to approximately 28 satellites are in orbit at any one time, and of these, from 6 to 12 are visible to a GPS receiver at any one location on the earth at any one time. Thus, the preferable range of m values is 6 to 12, and a preferred m value is 12.

(i) Initialization of X:

The baseline states ($x_1$ through $x_n$) are preferably initialized as known in the art.

Preferably, for applications using GPS-aided navigation, the global iono state is initialized once, at the start of the GPS-aided navigation. The initial global iono state can be selected or computed by a practitioner of the invention. A preferred selected value is 5 meters. If the practitioner prefers to compute the initial global iono state (among the factors that affect the iono delays are the 11 year solar cycle and the daily day-night cycle), the preferable inputs used to initialize the global iono state are as follows:

Y=Year (preferably whole year, e.g., 2003);
D=Day, fraction of a year (a value between 0 and 1, e.g., June 30≈0.5)
T=UTC time of day (hours expressed as values 0–24);
φ=Latitude (expressed in degrees, −90 to 90);
λ=Longitude (expressed in degrees, −180 to 180);

The latitude and longitude values may be derived from the pseudoranges and satellite position data provided by the GPS receiver using standard techniques.

Using these inputs, the following values are computed:

$$\mu(Y,D)=0.1624\{24+15\cos[2\pi(Y+D-1957.8)/11]\}\{1+0.12\cos[2\pi D]-0.2\cos[4\pi D]\}$$

$$f(\phi) = 1 + \frac{2(90° - |\phi|)}{90°}$$

$$TOD(T, \lambda) = T + \frac{\lambda}{15}$$

wherein TOD(T,λ) represents the local time of day, and (1) if TOD<0, then TOD=TOD+24; and (2) if TOD>24, then TOD=TOD−24;

$$g(TOD) = \cos\left[\frac{2\pi(TOD - 14)}{30}\right]; \quad \text{for } 7 < TOD < 21$$

g(TOD)=0.1045; for other TOD values

Using these computed values, the initial value for the global iono state $x_{GLOBAL}(0)$ (or $x_{n+1}(0)$) can be computed as follows:

$$x_{GLOBAL}(0)=\mu(Y,D)f(\phi)g(TOD(T,\lambda))$$

The term $\mu$ is the estimated mean global ionospheric delay at zenith for the $L_1$ frequency, which roughly matches historical ionospheric measurements for 11-year, annual and semi-annual cycles. The f(.) function scales the global mean delay by latitude such that equatorial latitudes have larger mean ionospheric delays than more extreme latitudes. The g(.) function scales the global mean ionospheric delay at latitude by time of day using a cosine function such that daytime delays are larger than night-time delays.

The m local iono states ($x_{n+2}$ through $x_{n+m+1}$) are also preferably initialized at the beginning of GPS-aided navigation and, for a particular local state, whenever there is a change in the status of the tracked satellite (as various satellites become visible and invisible to the GPS receiver). Preferably, the local iono states are initialized to zero.

To properly index each local iono state with the appropriate satellite, the following rules are preferably implemented in software:

(1) each local iono state index (n+2 through n+m+1 for m total, referred to hereinafter as a slot) shall cross-reference a particular satellite number to a local iono state;

(2) a slot cross-reference shall remain the same for as long as the satellite associated therewith is in the list of m slots;

(3) each satellite currently tracked by the GPS receiver shall have a corresponding slot, subject to the proviso of rule (5);

(4) even if a satellite is no longer tracked by the GPS receiver, the slot assignments are maintained until a more newly-tracked satellite forces the limit of m slots to be exceeded;

(5) if all m slots currently have a satellite assigned thereto, and a new satellite tracked by the GPS receiver causes the limit to m slots to be exceeded, then the slot corresponding to the "oldest" satellite (such an "oldest" satellite being determined by the time of the last measurement update therefrom) shall be re-assigned to the new satellite;

(6) upon re-assignment of a slot, the corresponding local iono state and local covariance state shall be re-initialized.

Figure 3:
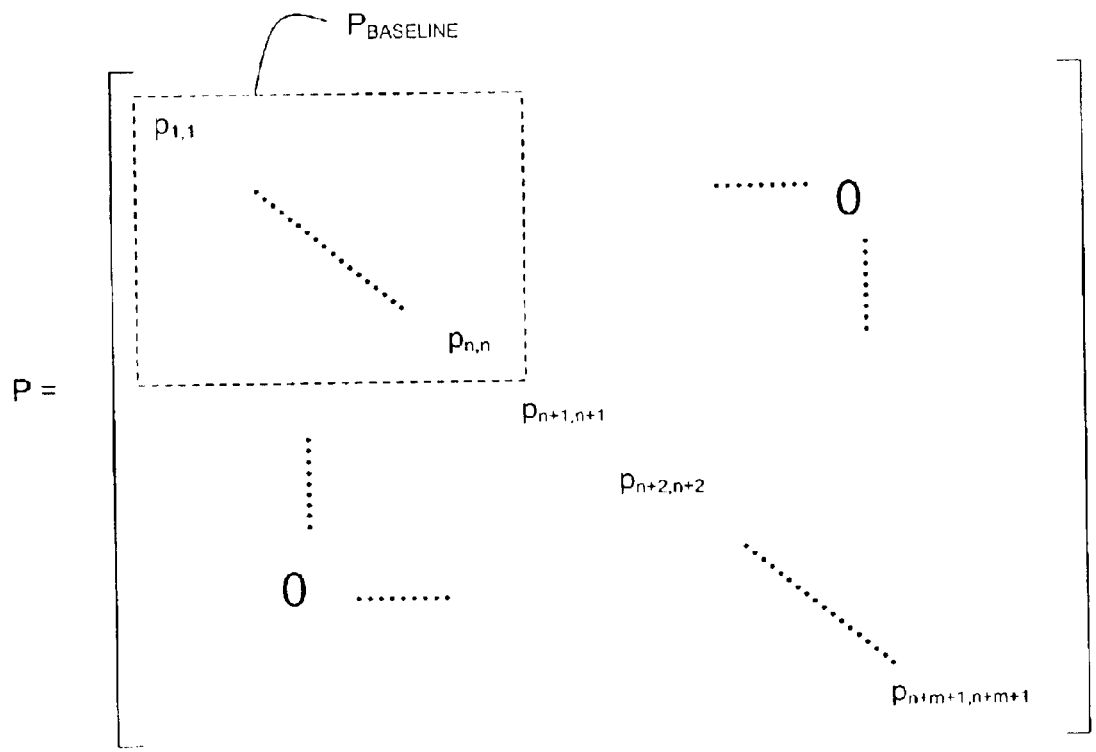
FIG. 3 depicts the state covariance matrix P.

B. State Covariance Matrix P:

FIG. 3 illustrates the preferred state covariance matrix P. The preferable size of P is n+m+1 by n+m+1. P comprises a baseline matrix $P_{BASELINE}$ of size n×n, augmented by additional diagonal elements corresponding to the global covariance estimate and m local covariance estimates. $P_{BASELINE}$ is readily understood in the art and need not be elaborated upon herein as it is left unchanged in the practice of the present invention. All off-diagonal elements for the augmented part of P (the part of P not belonging to $P_{BASELINE}$) are set to zero. The augmented covariance element corresponding to the global iono covariance is $p_{n+1,n+1}$. Its value is $\sigma_G^2$, with $\sigma_G^2$ preferably being initialized to (5 meters)², or $p_{n+1,n+1}(0)=25$. The diagonal states corresponding to the local iono covariances are $p_{i,i}$ wherein i ranges from n+2 to n+m+1. Each local iono covariance in P corresponds to a local iono state in X such that $p_{i,i}$ corresponds to $x_i$. Also, each local iono covariance $\sigma_L^2$ is preferably initialized with the same value, preferably $\sigma_L^2(0)=(2$ meters$)^2=4$.

C. State Transition Matrix Φ:

FIG. 4 depicts the preferred state transition matrix Φ. The preferable size of Φ is n+m+1 by n+m+1. Φ comprises a baseline matrix $\Phi_{BASELINE}$ of size n×n, augmented by additional diagonal elements corresponding to the global transition and m local transitions. $\Phi_{BASELINE}$ is readily understood in the art and need not be elaborated upon herein. All off-diagonal elements for the augmented part of Φ (the part of Φ not belonging to $\Phi_{BASELINE}$) are set to zero. Each diagonal term of the augmented part of the matrix is set equal to ρ, wherein $\rho=e^{-T/\tau}$. T is the filter propagation period (the time since the last propagation. The variable τ is the time constant of the ionospheric error. The values for T and τ may be selected by the user, and the preferable values are 1 second for T and 1800 seconds (30 minutes) for τ. Further, the time constant for the global element may be different than the time constant for the local elements, but it is preferred that the same value be used.

D. Process Noise Matrix Q:

FIG. 5 depicts the preferred process noise matrix Q. The preferable size of Q is n+m+1 by n+m+1. Q comprises a baseline matrix $Q_{BASELINE}$ of size n×n, augmented by additional diagonal elements corresponding to the global transition and m local transitions. $Q_{BASELINE}$ is readily understood in the art and need not be elaborated upon herein. All off-diagonal elements in the augmented part of Q are set to zero. The global diagonal element ($q_{n+1,n+1}$) is preferably set equal to $\sigma_G^2(1-\rho^2)$ and the local diagonal elements ($q_{n+2,n+2}$ through $q_{n+m+1,n+m+1}$) are preferably set equal to $\sigma_L^2(1-\Sigma^2)$.

E. Measurement Sensitivity Matrix H:

FIG. 6 depicts the preferred measurement sensitivity matrix H. H is preferably constructed by rows, with one row for each pseudorange measurement from a satellite. Each row of H will comprise n+m+1 elements. Further, each row of H corresponding to the pseudorange measurement from a particular satellite is dependent upon (1) the elevation of the satellite, as determined with standard techniques using satellite position data from the GPS receiver and estimated GPS position data available from the GPS receiver and/or the baseline filter states of X, (2) whether the measurement was formulated while tracking the $L_1$ or $L_2$ frequency (the particular tracking frequency may change over time), and (3) and the indexing scheme that is used to associate each satellite with one of the local iono states.

The preferable size of H is m by n+m+1. Each row of H comprises a vector $H_{BASELINE}$ (columns 1 through n for each row of H), augmented by additional elements corresponding to global and local iono elements. $H_{BASELINE}$ is readily understood in the art and need not be elaborated upon herein. The construction of each pseudorange row of H is as follows:

$$Row(i)=[H_{BASELINE} \alpha\beta \alpha\beta H^i_{LOCAL}]$$

wherein $H_{BASELINE}$ has a length of n, and $H^i_{LOCAL}$ is a 1×m vector with all elements being zero except for the element that corresponds to the satellite associated with the row. Thus, for row 1 (which is associated with satellite 1), $H_{LOCAL}$ will be represented by [1 0 0 . . . 0], for row 2, $H_{LOCAL}$ will be [0 1 0 . . . 0], and so on for each row.

Figure 7:
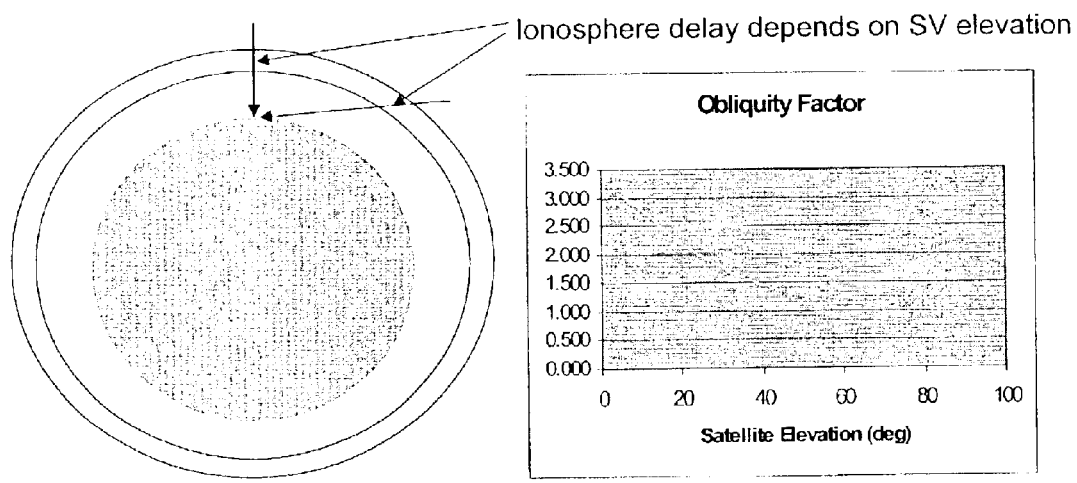
FIG. 7 illustrates preferred values for the obliquity factor as a function of satellite elevation.

The variable α represents the iono "obliquity" factor. The obliquity factor generally represents the ratio between the iono delay at a given satellite elevation and the iono delay for a satellite at zenith. It can be calculated as:

$$\alpha=[1-0.8981 \cos^2(El)]^{-1/2}$$

wherein the variable "El" is the elevation of the particular satellite the corresponds with the row (defined so that the horizon is zero elevation and zenith is 90 degrees). FIG. 7 illustrates the preferred obliquity factor values as a function of satellite elevation. Preferably, the satellite elevation is calculated in software using normal geometric relationships (based on the satellite position data and position estimates (from either the Kalman filter states or the GPS receiver pseudorange measurements) that are readily known in the art.

The scale factor β adjusts the obliquity factor to account for frequency. If the satellite is being tracked on the $L_1$ frequency, the scalar β preferably equals 1. If the satellite is being tracked on the $L_2$ frequency, the scalar β preferably equals 1.6469.

It should be noted, that in setting up the matrices, vectors, and variables for the modified Kalman filter, the values for τ, $\sigma_G$, $\sigma_L$, initial global iono state $x_{GLOBAL}(0)$, and initial global iono covariance $p_{GLOBAL}(0)$ can be important tuning parameters that optimize performance for a specific application. While the specific values set forth herein are preferred, practitioners of the present invention may use different values of their choosing to tailor the filter's performance to their particular end uses.

Figure 8A:
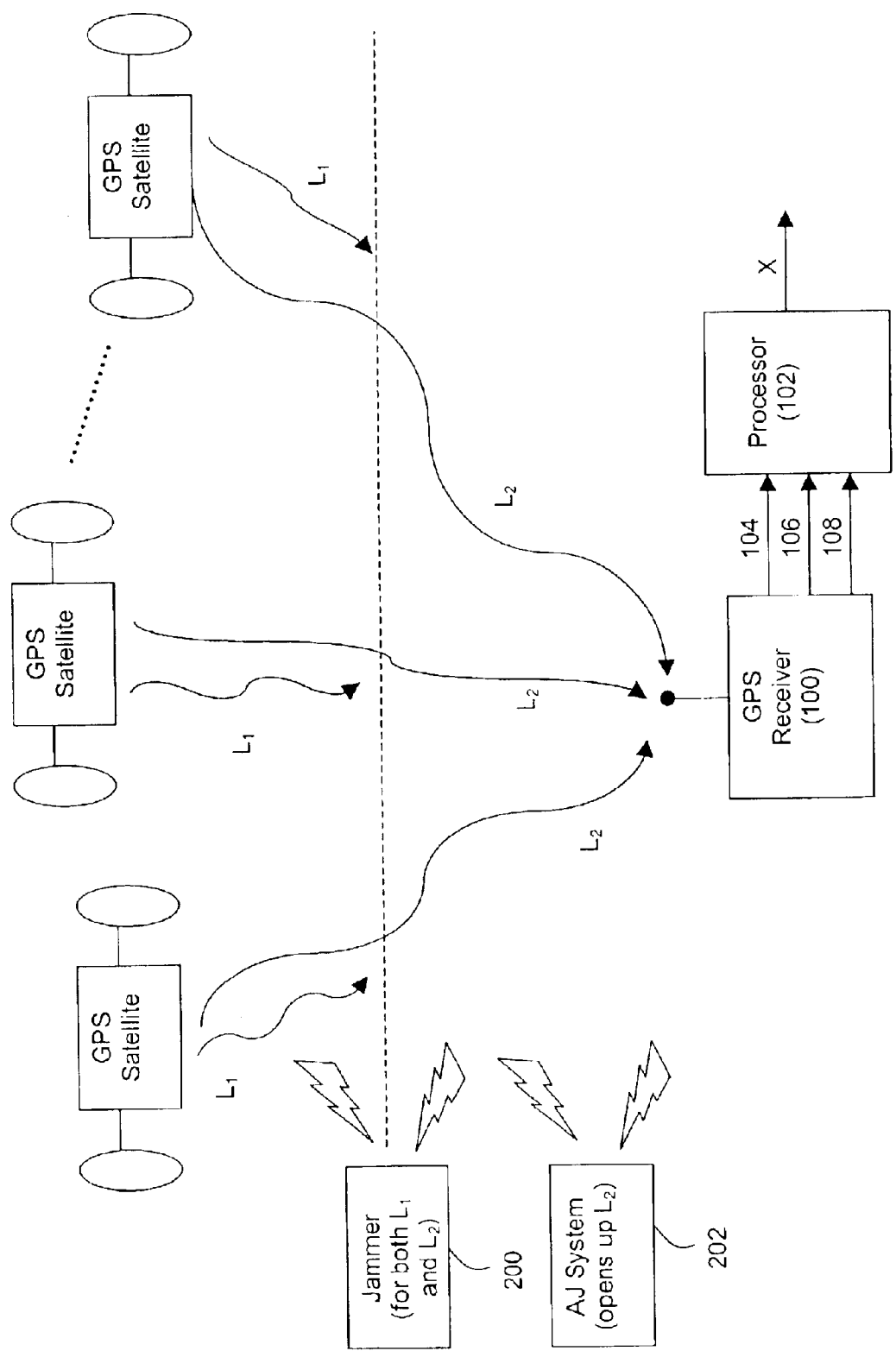
FIGS. 8(a) and 8(b) depict applications of the present invention in environments where GPS signal jamming is present.
Figure 8B:
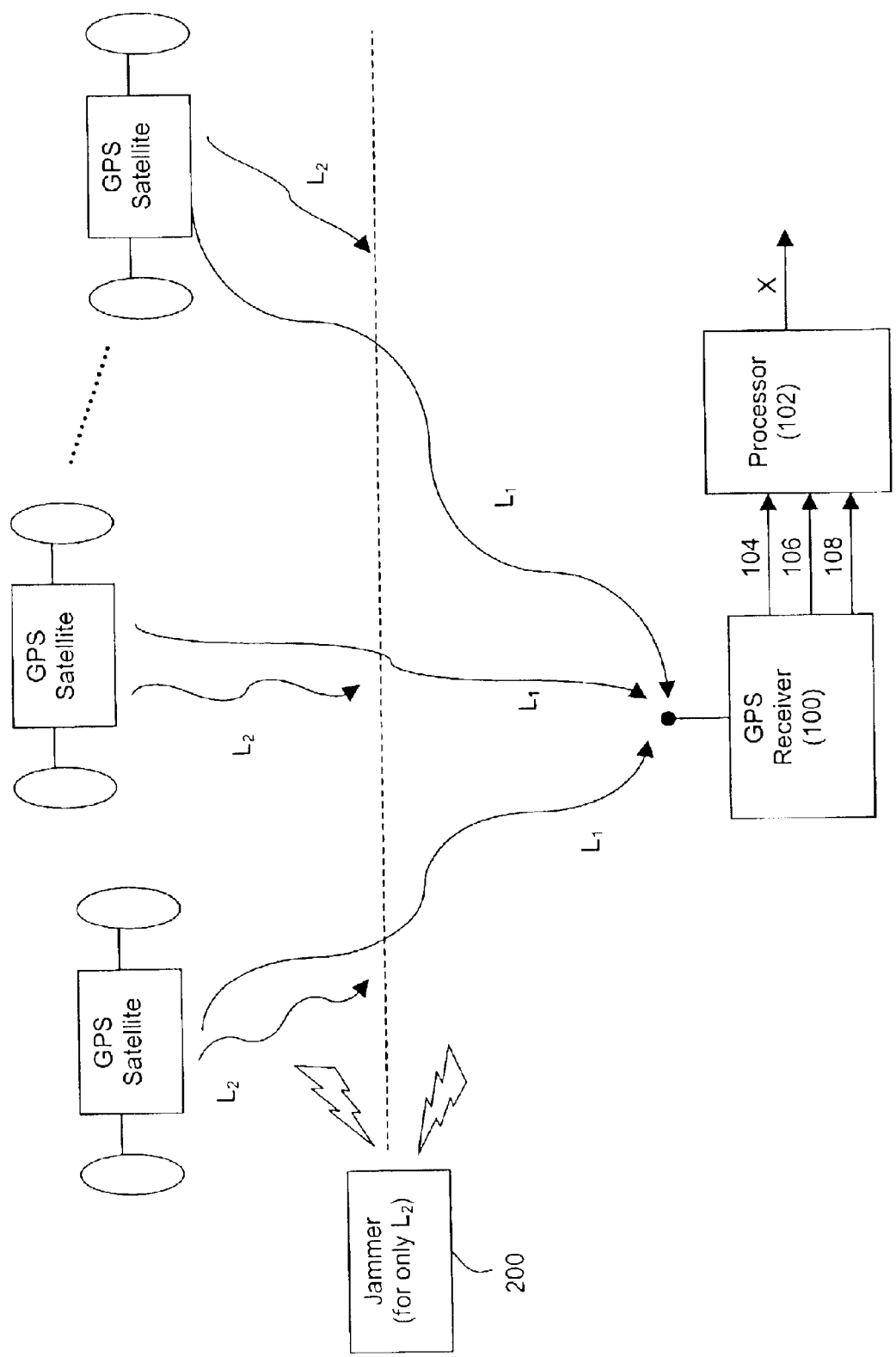

The present invention is particularly suitable for use in environments where a jammer is used to disrupt either or both of the $L_1$ and $L_2$ GPS signals. Because only a single GPS frequency is needed by the present invention at any given time, the present invention maintains the ability to accurately estimate ionospheric delay (and thereby reduce the CEP of the determined position) using a low cost single frequency ($L_1$ or $L_2$) anti-jamming (AJ) system. A single frequency AJ system costs much less than a dual frequency one. FIGS. 8(a) and 8(b) illustrate the suitability of the present invention in situations where (a) a jammer 200 is used to jam both the $L_1$ and $L_2$ GPS signals and a single frequency AJ system 202 is used to free one of the two GPS signals (in the case of FIG. 8(a), the $L_2$ signal), and (b) where a jammer 200 is used to jam one of the two GPS signals (in the case of FIG. 8(b), the $L_1$ signal).

Figure 9:
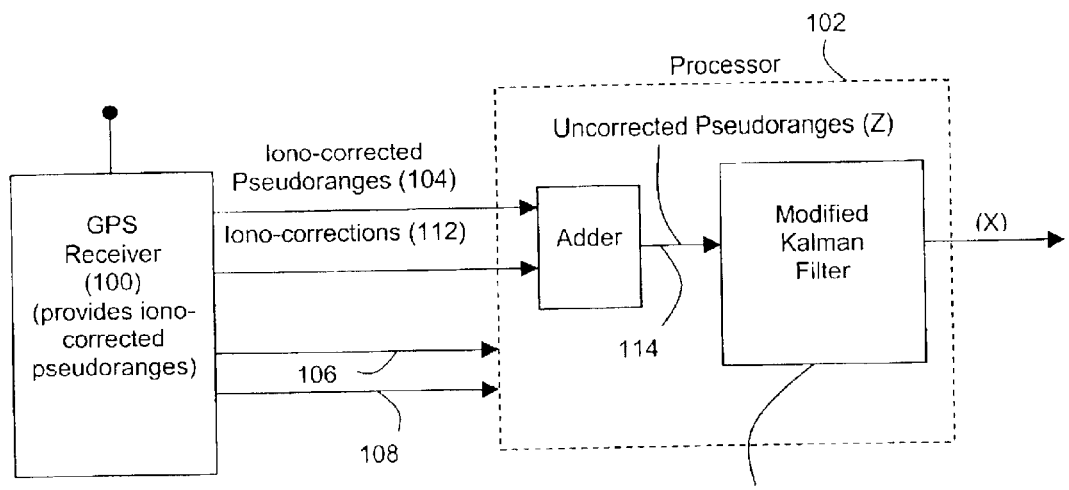
FIG. 9 illustrates an implementation of the present invention where the GPS receiver produces ionospheric delay-corrected pseudorange measurements.

Also, it should be noted that the preferred GPS receiver 100 of the present invention does not perform its own ionospheric delay corrections. Preferably, the pseudorange measurements produced by the GPS receiver includes an uncorrected amount of ionospheric delay, and the processor 102 estimates this delay amount. However, the GPS receiver 100 may be of the type that produces iono-corrected pseudorange measurements. With such GPS receivers, the receiver will also communicate its ionospheric delay correction amounts. Because of the high accuracy level of the present invention, a practitioner may wish to rely on the delay estimates generated by the processor 102 rather than whatever correction is provided internally by the GPS receiver. In such situations, with reference to FIG. 9, the processor 102 can also receive data 112 from the GPS receiver 100 that is indicative of the receiver's internal ionospheric delay correction amounts. Preferably, the processor 102 then operates to remove these correction amounts from the pseudorange measurements 102, thereby creating uncorrected pseudorange measurements 114. Then, the ionospheric delay for these uncorrected pseudorange measurements 114 may be generated by the processor in accordance with the teachings of the present invention.

Further still, a GPS receiver may implement on-board internal ionospheric delay estimation in accordance with the teachings of the present invention. In these situations, the processor 102 would be internal to the GPS receiver 100. Such a use of the present invention may be particularly suitable for commercial GPS receivers where only a single GPS frequency is available.

Figure 10:
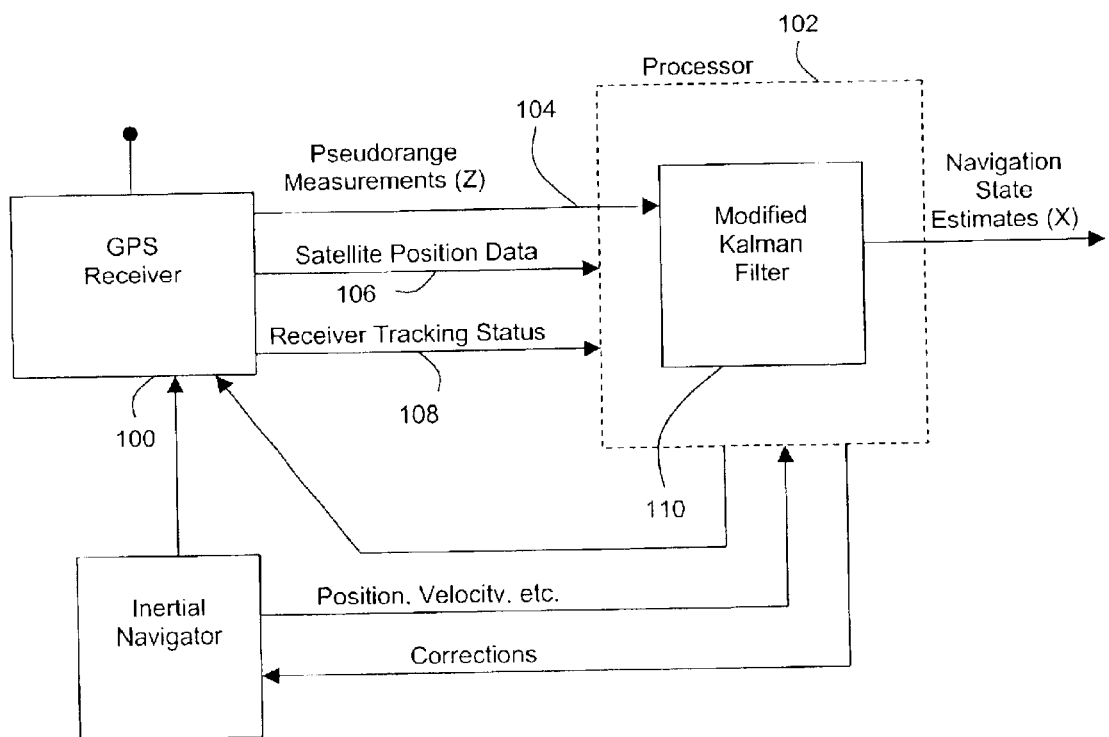
FIG. 10 illustrates an implementation of the present invention wherein an inertial navigator is incorporated into the overall system.

Moreover, it should be noted that the system of the present invention may also incorporate other sensors, such as an inertial navigator 300, as shown in FIG. 10. In applications such as GPS-guided munitions where the GPS vehicle will be in motion, an inertial navigator 300 provides improved estimation of vehicle attitude (roll, pitch, yaw) and helps maintain position and velocity estimates for highly dynamic vehicles and during GPS outages. These interactions with the navigator 300 via feedback loops such as those shown in FIG. 10 are understood in the art (see, for example, Farrell, J. A. and Barth, M., *The Global Positioning System & Inertial Navigation*, McGraw-Hill 1999, the entire disclosure of which is incorporated herein by reference), and would benefit from the improved ionospheric delay estimates provided by the present invention.

While the present invention has been described above in relation to its preferred embodiment, various modifications may be made thereto that still fall within the invention's scope, as would be recognized by those of ordinary skill in the art upon review of the teachings herein. As such, the full scope of the present invention is to be defined solely by the appended claims and their legal equivalents.

What is claimed is:

1. A method for estimating ionospheric delays present in pseudorange measurements produced by a global positioning system (GPS) receiver configured to track a plurality of GPS satellites, the method comprising:
   at a Processor that receives pseudorange measurements from a single GPS receiver, (1) estimating an amount of global ionospheric delay in the pseudorange measurements attributable to all of the tracked GPS satellites; and (2) for each tracked GPS satellite, estimating an amount of local ionospheric delay in the pseudorange measurements attributable thereto.

2. The method of claim 1 wherein the global ionospheric delay estimating step comprises estimating, at the processor, the global ionospheric delay amount as a function of a single GPS frequency $L_1$ or $L_2$.

3. The method of claim 2 wherein the local ionospheric delay estimating step comprises estimating, at the processor, each of the local ionospheric delay amounts as a function of a single GPS frequency $L_1$ or $L_2$.

4. The method of claim 1 wherein the local ionospheric delay estimating step comprises estimating, at the processor, each of the local ionospheric delay amounts as a function of a single GPS frequency $L_1$ or $L_2$.

5. The method of claim 1 wherein the GPS receiver is in motion.

6. A method for estimating ionospheric delays present in pseudorange measurements produced by a global positioning system (GPS) receiver configured to track a plurality of GPS satellites, the method comprising:
   estimating an amount of global ionospheric delay attributable to all of the tracked GPS satellites as a function of a single GPS frequency $L_1$ or $L_2$; and
   for each tracked GPS satellite, estimating an amount of local ionospheric delay attributable thereto.

7. The method of claim 6 wherein the local ionospheric delay estimating step comprises estimating each of the local ionospheric delay amounts as a function of a single GPS frequency $L_1$ or $L_2$.

8. The method of claim 6 further comprising performing each of the recited steps for a GPS receiver that is in motion.

9. A method for estimating ionospheric delays present in pseudorange measurements produced by a global positioning system (GPS) receiver configured to track a plurality of GPS satellites, the method comprising:
   estimating an amount of global ionospheric delay attributable to all of the tracked GPS satellites; and
   for each tracked GPS satellite, estimating an amount of local ionospheric delay attributable thereto;
   wherein the local ionospheric delay estimating step comprises estimating each of the local ionospheric delay amounts as a function of a single GPS frequency $L_1$ or $L_2$.

10. The method of claim 9 further comprising performing each of the recited steps for a GPS receiver that is in motion.

11. A global positioning system comprising:
   a global positioning system (GPS) receiver configured to (1) receive a plurality of signals from a plurality of visible GPS satellites, and (2) produce a plurality of pseudorange measurements from the received signals, the pseudorange measurements being indicative of the GPS receiver's position and having an amount of ionospheric delay error contained therein;
   a processor configured to estimate the amount of ionospheric delay in the pseudorange measurements by (1) estimating an amount of global ionospheric delay attributable collectively to the plurality of visible GPS satellites, and (2) estimating a plurality of amounts of local ionospheric delays, each local ionospheric delay being attributable to a different visible GPS satellite.

12. The system of claim 11 wherein the processor uses a modified Kalman filter in estimating the ionospheric delay amounts.

13. The system of claim 12 wherein the processor is further configured to estimate the ionospheric delay amounts as a function of a single GPS frequency $L_1$ or $L_2$.

14. The system of claim 13 wherein the processor is further configured to initially set the global ionospheric delay amount equal to a predetermined value and subsequently modify that initial value as a function of an obliquity factor and a scalar, the scalar being dependent upon the single GPS frequency.

15. The system of claim 14 wherein the processor is further configured to initially set each of the local ionospheric delay amounts equal to a predetermined value and subsequently modify those initial values as a function of an obliquity factor and a scalar, the scalar being dependent upon the single GPS frequency.

16. The system of claim 15 wherein each of the initial values for the local ionospheric delay amounts are equal to each other.

17. The system of claim 13 wherein the processor is further configured to initially set each of the local ionospheric delay amounts equal to a predetermined value and subsequently modify those initial values as a function of an obliquity factor and a scalar, the scalar being dependent upon the single GPS frequency.

18. The system of claim 17 wherein each of the initial values for the local ionospheric delay amounts are equal to each other.

19. The system of claim 12 wherein the processor is further configured to estimate the ionospheric delay amounts as a function of a both GPS frequencies $L_1$ and $L_2$ simultaneously.

20. The system of claim 11 wherein the GPS receiver is in motion.

21. A method of generating global position system (GPS) ionospheric delay estimates, the method comprising:

augmenting a GPS Kalman filter with (1) a state representing a global ionospheric delay attributable to a plurality of GPS satellites and (2) a plurality of states representing local ionospheric delays, each local ionospheric delay being attributable to a particular GPS satellite;

receiving a plurality of pseudorange measurements from a GPS receiver, the pseudorange measurements having an amount of ionospheric delay included therein; and processing the received pseudorange measurements with the augmented Kalman filter to thereby generate estimates of the amount of ionospheric delay present in the received pseudorange measurements.

22. The method of claim 21 wherein the global ionospheric delay state depends upon a single GPS frequency, $L_1$ or $L_2$.

23. The method of claim 22 wherein the local ionospheric delay states depend upon a single GPS frequency, $L_1$ or $L_2$.

24. The method of claim 23 further comprising:

providing a measurement sensitivity matrix H for the augmented Kalman filter, wherein H comprises a predetermined number of rows m corresponding to the maximum number of GPS satellites tracked by the filter at any one time, each row corresponding to a particular GPS satellite tracked by the filter and comprising a predetermined number n+m+1 elements, wherein (1) elements 1 through n are baseline H elements, (2) element n+1 is an obliquity factor multiplied by a GPS frequency coefficient, and (3) elements n+2 through n+m+1 comprise a local iono vector, wherein each element is equal to zero except for an element associated with the GPS satellite corresponding to the row, which is equal to a local iono scalar.

25. The method of claim 24 wherein the local iono scalar is the obliquity factor multiplied by the GPS frequency coefficient.

26. A system for estimating global position using signals received from a plurality of global positioning system (GPS) satellites, the system comprising:

a GPS receiver for receiving GPS signals from a plurality of GPS satellites and producing a pseudorange position estimate therefrom that is representative of the global position of the GPS receiver, the pseudorange estimate having no correction for ionospheric delay;

a processor for receiving and refining the pseudorange estimate, the processor comprising a Kalman filter configured to correct for ionospheric delay in the pseudorange estimate, the Kalman filter comprising a state representing a global ionospheric delay estimate and a plurality of states representing local ionospheric delay estimates for individual GPS satellites.

27. The system of claim 26 wherein the global Kalman filter state is a function of a single GPS frequency, $L_1$ or $L_2$.

28. The system of claim 27 wherein the GPS satellites transmit GPS signals on two frequencies, $L_1$ and $L_2$, wherein both of those frequencies are jammed by a jamming device, the system further comprising an antijammer for unjamming one of the two frequencies.

29. The system of claim 28 wherein the antijammer unjams only one of the two frequencies.

30. The system of claim 26 wherein the GPS receiver is in motion.

31. A method of generating the amount of ionospheric delay present in global positioning system (GPS) pseudorange measurements, the method comprising:

at a processor associated with a single GPS receiver, (a) receiving a plurality of pseudorange measurements from the single GPS receiver configured to receive signals from a plurality of visible GPS satellites, the pseudorange measurements being indicative of the GPS receiver's position and having an amount of ionospheric delay error contained therein; and (b)

estimating the amount of ionospheric delay in the pseudorange measurements by (1) estimating an amount of global ionospheric delay attributable collectively to the plurality of visible GPS satellites, and (2) estimating a plurality of amounts of local ionospheric delays, each local ionospheric delay being attributable to a different visible GPS satellite.

32. The method of claim 31 wherein the estimating step estimates the ionospheric delay amounts using a modified Kalman filter.

33. The method of claim 32 wherein the estimating step further comprises estimating the ionospheric delay amounts as a function of a single GPS frequency $L_1$ or $L_2$.

34. The method of claim 33 wherein the step of estimating the global ionospheric delay amount comprises initially setting the global ionospheric delay amount equal to a predetermined value and subsequently modifying that initial value as a function of an obliquity factor and a scalar, the scalar being dependent upon the single GPS frequency.

35. The method of claim 34 wherein the step of estimating the local ionospheric delay amounts comprises initially setting each of the local ionospheric delay amounts equal to a predetermined value and subsequently modify those initial values as a function of an obliquity factor and a scalar, the scalar being dependent upon the single GPS frequency.

36. The method of claim 35 wherein each of the initial values for the local ionospheric delay amounts are equal to each other.

37. The method of claim 33 wherein the step of estimating the local ionospheric delay amounts comprises initially setting each of the local ionospheric delay amounts equal to a predetermined value and subsequently modifying those initial values as a function of an obliquity factor and a scalar, the scalar being dependent upon the single GPS frequency.

38. The method of claim 37 wherein each of the initial values for the local ionospheric delay amounts are equal to each other.

39. The method of claim 32 wherein the estimating step comprises estimating the ionospheric delay amounts as a function of a both GPS frequencies $L_1$ and $L_2$ simultaneously.

40. A method of generating the amount of ionospheric delay present in GPS pseudorange measurements, the method comprising:

receiving a plurality of pseudorange measurements from a global positioning system (GPS) receiver configured to receive signals from a plurality of visible GPS satellites, the pseudorange measurements being indicative of the GPS receiver's position and having an amount of ionospheric delay error contained therein; and using a modified Kalman filter, estimating the amount of ionospheric delay in the pseudorange measurements by (1) estimating an amount of global ionospheric delay attributable collectively to the plurality of visible GPS satellites, and (2) estimating a plurality of amounts of local ionospheric delays, each local ionospheric delay being attributable to a different visible GPS satellite.

41. The method of claim 40 wherein the estimating step further comprises estimating the ionospheric delay amounts as a function of a single GPS frequency $L_1$ or $L_2$.

42. The method of claim 41 wherein the step of estimating the global ionospheric delay amount comprises initially setting the global ionospheric delay amount equal to a predetermined value and subsequently modifying that initial value as a function of an obliquity factor and a scalar, the scalar being dependent upon the single GPS frequency.

43. The method of claim 42 wherein the step of estimating the local ionospheric delay amounts comprises initially setting each of the local ionospheric delay amounts equal to a predetermined value and subsequently modifying those initial values as a function of an obliquity factor and a scalar, the scalar being dependent upon the single GPS frequency.

44. The method of claim 43 wherein each of the initial values for the local ionospheric delay amounts are equal to each other.

45. The method of claim 41 wherein the step of estimating the local ionospheric delay amounts comprises initially setting each of the local ionospheric delay amounts equal to a predetermined value and subsequently modifying those initial values as a function of an obliquity factor and a scalar, the scalar being dependent upon the single GPS frequency.

46. The method of claim 45 wherein each of the initial values for the local ionospheric delay amounts are equal to each other.

47. The method of claim 40 wherein the estimating step comprises estimating the ionospheric delay amounts as a function of a both GPS frequencies $L_1$ and $L_2$ simultaneously.

48. A global positioning system comprising:
a global positioning system (GPS) receiver configured to (1) receive a plurality of signals from a plurality of visible GPS satellites, (2) produce a plurality of pseudorange measurements from the received signals, the pseudorange measurements being indicative of the GPS receiver's position, (3) estimate an amount of ionospheric delay error in the pseudorange measurements, and (4) correct the pseudorange measurements using the estimated ionospheric delay error;
a processor configured to (1) receive the corrected pseudorange measurements and the estimated ionospheric delay error amounts from the GPS receiver, (2) add the received estimated ionospheric delay error amounts to the corrected pseudorange measurements to thereby create uncorrected pseudorange measurements, and (3) estimate anew the amount of ionospheric delay in the uncorrected pseudorange measurements by (a) estimating an amount of global ionospheric delay attributable collectively to the plurality of visible GPS satellites, and (b) estimating a plurality of amounts of local ionospheric delays, each local ionospheric delay being attributable to a different visible GPS satellite.

49. The system of claim 48 wherein the processor uses a modified Kalman filter in estimating the ionospheric delay amounts.

50. The system of claim 49 wherein the processor is further configured to estimate the ionospheric delay amounts as a function of a single GPS frequency $L_1$ or $L_2$.

51. The system of claim 50 wherein the processor is further configured to initially set the global ionospheric delay amount equal to a predetermined value and subsequently modify that initial value as a function of an obliquity factor and a scalar, the scalar being dependent upon the single GPS frequency.

52. The system of claim 51 wherein the processor is further configured to initially set each of the local ionospheric delay amounts equal to a predetermined value and subsequently modify those initial values as a function of an obliquity factor and a scalar, the scalar being dependent upon the single GPS frequency.

53. The system of claim 52 wherein each of the initial values for the local ionospheric delay amounts are equal to each other.

54. The system of claim 50 wherein the processor is further configured to initially set each of the local ionospheric delay amounts equal to a predetermined value and subsequently modify those initial values as a function of an obliquity factor and a scalar, the scalar being dependent upon the single GPS frequency.

55. The system of claim 54 wherein each of the initial values for the local ionospheric delay amounts are equal to each other.

56. The system of claim 49 wherein the processor is further configured to estimate the ionospheric delay amounts as a function of a both GPS frequencies $L_1$ and $L_2$ simultaneously.

57. A system for estimating the amount of ionospheric delay present in a pseudorange measurement, the system comprising:
a global positioning system (GPS) receiver configured to track a plurality of GPS satellites and generate pseudorange measurements Z corresponding to the tracked GPS satellites, the pseudorange measurements Z being indicative of the GPS receiver's position and having an amount of ionospheric delay error present therein;
a processor configured to estimate the amount of ionospheric delay present in the pseudorange measurements Z, the processor comprising a Kalman filter, the Kalman filter comprising: (1) a state vector X comprising n baselines states, one state corresponding to a global ionospheric delay estimate, and m states corresponding to local ionospheric delay estimates, wherein m is a predetermined value and corresponds to a number of GPS satellites tracked by the GPS receiver, (2) a measurement sensitivity matrix H comprising m rows, each row being associated with a particular GPS satellite tracked by the GPS receiver and comprising n baseline coefficients, one global ionospheric delay coefficient, and m local ionospheric delay coefficients, each local ionospheric delay coefficient corresponding to a particular GPS satellite tracked by the GPS receiver and being equal to zero except for the local ionospheric delay coefficient corresponding to the GPS satellite associated with that particular row of H, (3) an n+m+1 by n+m+1 covariance estimate matrix P comprising an n by n baseline covariance estimate matrix $P_{BASELINE}$ with elements $p_{1,1}$ through $p_{n,n}$ being diagonal elements of $P_{BASELINE}$, wherein diagonal element $p_{n+1,n+1}$ is set equal to a global ionospheric delay covariance $\sigma_G^2$, wherein diagonal elements $p_{n+2,n+2}$ through $p_{n+m+1,n+m+1}$ are set equal to $\sigma_L^2$, and wherein all off-diagonal elements outside $P_{BASELINE}$ are set equal to zero, (4) an n+m+1 by n+m+1 state transition matrix $\Phi$ comprising an n by n baseline state transition matrix $\Phi_{BASELINE}$ with elements $\Phi_{1,1}$ through $\Phi_{n,n}$ being diagonal elements of $\Phi_{BASELINE}$, wherein diagonal elements $p_{n+1,n+1}$ through $p_{n+m+1,n+m+1}$ are set equal to $\rho$, wherein all off-diagonal elements outside $\Phi_{BASELINE}$ are set equal to zero, wherein $\rho=e^{-T/\tau}$, wherein T represents a filter propagation time having a predetermined value, and wherein $\tau$ represents a time constant having a predetermined value, (5) an n+m+1 by n+m+1 process noise matrix Q comprising an n by n baseline state transition matrix $Q_{BASELINE}$ with elements $Q_{1,1}$ through $Q_{n,n}$ being diagonal elements of $Q_{BASELINE}$, wherein diagonal element $p_{n+1,n+1}$ is set equal to $\sigma_G^2(1-\rho^2)$, wherein diagonal elements $p_{n+2,n+2}$ through $p_{n+m+1,n+m+1}$ are set equal to $\sigma_L^2(1-\rho^2)$, and wherein all off-diagonal elements outside $Q_{BASELINE}$ are set equal to zero, (6) a measurement noise covariance matrix R, and (7) wherein the Kalman filter operates by (a) propagating the state vector to measurement time according to the formula $X=\Phi X$, (b) propagating the covariance estimate matrix to measurement time according to the formula $P=\Phi P\Phi^T+Q$, (c) calculating a Kalman filter gain K according to the formula $K=PH^T[HPH^T+R]^{-1}$, (d) updating the state vector according to the formula $X=X+K[Z-HX]$, and (e) updating the covariance estimate matrix according to the formula $P=[I-KH]P$, wherein I is an identity matrix.

58. The system of claim 57 wherein the global ionospheric delay coefficient in H is $\alpha\beta$, wherein a is an obliquity factor and $\beta$ is a frequency scalar dependent upon a single GPS frequency $L_1$ or $L_2$.

59. The system of claim 58 wherein the global ionospheric delay state $x_{n+1}$ is initialized to a value of 5 meters.

60. The system of claim 59 wherein the local ionospheric delay states $x_{n+2}$ through $x_{n+m+1}$ are each initialized to predetermined values of zero.

61. The system of claim 60 wherein the global ionospheric covariance estimate is initialized to a predetermined value of 25 meters$^2$.

62. The system of claim 60 wherein the local ionospheric covariance estimates $p_{n+2}$ through $p_{n+m+1}$ are each initialized to predetermined values of $\sigma_L^2=4$ meters$^2$.

63. The system of claim 58 wherein the global ionospheric delay state $x_{n+1}$ is initialized to a value that is a predetermined function of year, time of day, latitude, and longitude.

64. A device for estimating global position, the device comprising:

a single frequency GPS receiver configured to (1) track a plurality of GPS satellites, (2) produce a plurality of pseudorange measurements corresponding to the tracked GPS satellites, the pseudorange measurements having an amount of ionospheric delay error present therein, (3) estimate an amount of global ionospheric delay attributable to all of the tracked GPS satellites, (4) for each tracked GPS satellite, estimate an amount of local ionospheric delay attributable thereto, and (5) correct the pseudorange measurements using both the global ionospheric delay estimate and the plurality of local ionospheric delay estimates, the corrected pseudorange measurements being indicative of the global position of the GPS receiver.

65. The device of claim 64 wherein the GPS receiver is in motion.

* * * * *